(12) United States Patent
Moreau

(10) Patent No.: US 6,690,125 B1
(45) Date of Patent: Feb. 10, 2004

(54) CRT SCAN CIRCUIT WITH A GEOMETRY CORRECTION INDEPENDENT FROM THE SCAN FREQUENCY

(75) Inventor: Jean-Michel Moreau, Grenoble (FR)

(73) Assignee: STMicroelectronics S.A., Gentille (FR)

( * ) Notice: Subject to any disclaimer, the term of this patent is extended or adjusted under 35 U.S.C. 154(b) by 0 days.

(21) Appl. No.: 09/406,880

(22) Filed: Sep. 28, 1999

(30) Foreign Application Priority Data

Sep. 30, 1998 (FR) .............................. 98 12398

(51) Int. Cl.$^7$ ................................. G09G 1/04
(52) U.S. Cl. .................. 315/403; 315/387; 315/371
(58) Field of Search ............................ 315/403, 387, 315/407, 402, 51, 52, 53, 244, 245, 371, 370; G09G 1/04

(56) References Cited

U.S. PATENT DOCUMENTS

| | | | | |
|---|---|---|---|---|
| 3,553,478 A | * | 1/1971 | Heinz-Dieter ............... | 315/27 |
| 4,463,288 A | * | 7/1984 | Judd ......................... | 315/371 |
| 4,634,937 A | | 1/1987 | Haferl ........................ | 315/371 |
| 4,673,984 A | * | 6/1987 | Kikuchi et al. ............. | 358/190 |
| 4,827,194 A | * | 5/1989 | Fernsler ..................... | 315/371 |
| 4,945,292 A | | 7/1990 | Ackerson et al. ........... | 315/387 |
| 5,023,523 A | | 6/1991 | Tomita ....................... | 315/364 |
| 5,357,175 A | * | 10/1994 | Kamada et al. ............. | 315/411 |
| 5,717,296 A | | 2/1998 | Onozawa et al. ........... | 315/371 |
| 5,949,201 A | * | 9/1999 | Suzuki et al. ............... | 315/370 |
| 6,184,631 B1 | * | 2/2001 | Noma et al. ................ | 315/224 |
| 6,259,217 B1 | * | 7/2001 | Song .......................... | 315/387 |

FOREIGN PATENT DOCUMENTS

GB  2 186 64 A  * 1/1987 ............ H04N/3/23

* cited by examiner

Primary Examiner—Don Wong
Assistant Examiner—Trinh Vo Dinh
(74) Attorney, Agent, or Firm—Lisa K. Jorgenson; James H. Morris; Wolf, Greenfield & Sacks, P.C.

(57) ABSTRACT

A line scan circuit for a CRT, including, in series across a switch, two oscillating circuits having the same time constant, each including, in parallel, a capacitor, a diode connected in antiparallel, and a series association of an inductor and of a voltage source, the inductor of a first one of the oscillating circuits being a scan coil of the CRT; an amplifier receiving a set-point voltage and using, as a feedback, a voltage taken from one of the oscillating circuits, and providing an adjustable voltage source to the second oscillating circuit.

25 Claims, 3 Drawing Sheets

CRT SCAN CIRCUIT WITH A GEOMETRY CORRECTION INDEPENDENT FROM THE SCAN FREQUENCY

BACKGROUND OF THE INVENTION

1. Field of the Invention

The present invention relates to a CRT (Cathode Ray Tube) line scan circuit, and more specifically to a circuit enabling the use of the same geometry correction set-point whatever the scan frequency used. The invention is especially useful in computer monitors.

2. Discussion of the Related Art

Conventional scan circuits are described in several reference works, among which "New Handbook of Color Television", Chiron ed., volume 2, pages 197–207, 1981.

FIG. 1 shows a conventional scan circuit of the type which also generates the very-high voltage (THT) for the CRT. Between a node P and the ground are arranged, connected in parallel, a switch T, an antiparallel diode D, and a retrace capacitor Cr. The scan coil, Ld, is series-connected with a capacitor Cs between node P and ground. Capacitor Cs has a large value with respect to capacitor Cr.

Further, the primary winding Lp of a step-up transformer 10 is series-connected with a supply voltage source E between node P and ground. The very-high voltage THT is taken across the secondary winding Ls of transformer 10, rectified by a diode D1 and filtered by a capacitor C1.

FIG. 2 shows the shape of the deviation current flowing through coil Ld and the corresponding voltage taken from node P. Generally, the inductance of primary winding Lp of step-up transformer 10 is so high that it can be considered as an infinite impedance. Similarly, capacitor Cs has a value such that it can be considered as a low impedance voltage source providing a voltage substantially equal to supply voltage E (actually, capacitor Cs is maintained charged to value E via supply source E and windings Lp and Ld).

At a time t0, switch T is closed and the current through coil Ld is zero. Coil Ld is connected across capacitor Cs providing substantially constant voltage E. The current through capacitor Ld increases linearly with a slope E/Ld.

At a time t1, switch T is open. The current through coil Ld has reached a peak value Ip equal to E·t1/Ld (assuming that t0=0). Coil Ld is now connected in an L-C oscillating circuit with capacitor Cr, whereby the current through the coil varies as a sinusoid to reach a value -Ip at a time t2. Interval t1–t2 corresponds to a half-sinusoid of time constant $\sqrt{Ld \cdot Cr}$. It further corresponds to a line retrace which is of short duration with respect to the line scan duration.

During interval t1–t2, the voltage at node P varies according to a sinusoid halfwave of amplitude $Up = E \cdot t1/\sqrt{Ld \cdot Cr}$. This halfwave is applied to the primary winding of step-up transformer 10 to be converted into a very-high voltage.

At time t2, the voltage on node P tends to become negative to start a negative sine halfwave. Then, diode D turns on and takes all the current coming from coil Ld. Coil Ld is connected again across the voltage source formed by capacitor Cs, so that the current starts increasing linearly with a slope E/Ld to cross value 0 at a time t'0 where the cycle starts again. It should be noted that interval t2–t'0 has the same duration t1 as interval t0–t1.

In some applications, especially in computer monitors, the scan frequency, that is, time t1, should be variable. In the circuit of FIG. 1, it should be noted that the peak scan current Ip and the peak voltage Up are inversely proportional to the scan frequency. Now, modifying peak current Ip is out of the question, since it determines the horizontal scan amplitude, and the same applies to peak voltage Up, since it determines the high voltage which has to be maintained substantially constant. At first sight, it would be enough to vary supply voltage E proportionally to the frequency to maintain constant the scan amplitude and the high voltage.

However, the image width should be adjustable, and it must be possible to make geometry corrections. For example, if the scan current amplitude was maintained constant over the image height, the image edges would have a parabolic shape, which defect is corrected by modulating the amplitude of the scan current in a complementary parabolic way.

In other words, for a fixed scan frequency, the scan current amplitude should be modulated without modifying the value of the high voltage.

The circuit of FIG. 1 has thus been improved in the prior art to achieve this.

FIG. 3 shows such a circuit, called a "diode modulator". It includes the same elements as the circuit of FIG. 1, designated by the same references. Two oscillating circuits having the same time constants are connected in series across switch T, which remains connected between node P and ground. One of the oscillating circuits includes elements Ld, Cs, Cr, and D described in relation with FIG. 1. The second oscillating circuit includes an inductor Lm, two capacitors Cm and Crm, and a diode Dm, respectively homologous to elements Ld, Cs, Cr, and D. However, inductor Lm has no influence upon the horizontal deviation. A modulation voltage Vg is forced across capacitor Cm. This modulation voltage is intended for correcting the scan current without having any effect upon the value of the high voltage.

Each of the oscillating circuits operates independently and similarly during a scan cycle. Indeed, when switch T is closed, inductor Lm is connected across capacitor Cm, as illustrated, via diode D and switch T, while scan inductor Ld is connected across capacitor Cs, as illustrated, via diode Dm and switch T. When switch T is open, the current flows in each of the oscillating circuits as described for the single oscillating circuit of FIG. 1.

With this configuration, peak scan current Ip can be expressed as $(E-Vg) \cdot t1/Ld$. Indeed, the voltage across capacitor Cs settles at value $E-Vg$ and not at value E. Thus, the scan current amplitude is adjustable by acting upon modulation voltage Vg. Further, the peak voltage appearing on node P is equal to the sum of the peak voltages of the two oscillating circuits, that is:

$$Ip = (E-Vg) \cdot t1/\sqrt{Ld \cdot Cr} + Vg \cdot t1/\sqrt{Lm \cdot Crm}$$

This current is equal to $E \cdot t1/\sqrt{Ld \cdot Cr}$, since time constants Ld·Cr and Lm·Crm are chosen to be equal. Thus, the value of the high voltage is independent from modulation voltage Vg. However, if it is desired, in the circuit of FIG. 3, to keep the features of the displayed image when the scan frequency varies, not only supply voltage E, but also modulation voltage Vg, have to be modified proportionally to the frequency. Indeed, the scan current amplitude is proportional to $E-Vg$.

Supply voltage E can easily be varied according to the scan frequency, since this voltage is generally generated by a D.C./D.C. converter synchronized on the scan frequency and operating in a mode such that it generates a voltage proportional to its operating frequency.

However, to make modulation voltage Vg proportional to the frequency, a frequency-to-voltage converter and a multiplier which multiplies a set-point voltage independent from the frequency by the output of the frequency-to-voltage converter are generally used. This solution is complex and inaccurate.

SUMMARY OF THE INVENTION

An object of the present invention is to provide a line scan circuit which enables the modulation voltage to be made proportional to the frequency in a particularly simple and accurate manner.

To achieve this and other objects, the present invention provides a line scan circuit for a CRT, including, in series across a switch, two oscillating circuits having the same time constant, each including, in parallel, a capacitor, a diode connected in antiparallel, and a series association of an inductor and of a voltage source, the inductor of a first one of the oscillating circuits being a scan coil of the CRT; and means for adjusting the voltage source of the second oscillating circuit. The adjusting means include an amplifier receiving a set-point voltage and using, as a feedback, a voltage sampled from one of the oscillating circuits.

According to an embodiment of the present invention, the feedback voltage is the peak voltage taken across the second oscillating circuit.

According to an embodiment of the present invention, the feedback voltage is a voltage taken between two series-connected capacitors forming the capacitor of the second oscillating circuit.

According to an embodiment of the present invention, the amplifier includes an operational amplifier, the inverting input of which receives a negative set-point voltage via a first resistor and the feedback voltage via a second resistor.

According to an embodiment of the present invention, the circuit includes a peak detector with a diode connected in series with a capacitor.

According to an embodiment of the present invention, the voltage source of the first oscillating circuit is formed of a capacitor maintained charged by a supply voltage source connected in series with the primary winding of a step-up transformer across the switch.

The foregoing objects, features and advantages of the present invention, will be discussed in detail in the following non-limiting description of specific embodiments in connection with the accompanying drawings.

DETAILED DESCRIPTION

To obtain a modulation voltage varying proportionally with the scan frequency in a diode modulator line scan circuit, a voltage value proportional to the scan period is used in the circuit. This voltage value is, in one embodiment, the peak value taken between scan coil Ld and modulation coil Lm of FIG. 3.

Figure 1:
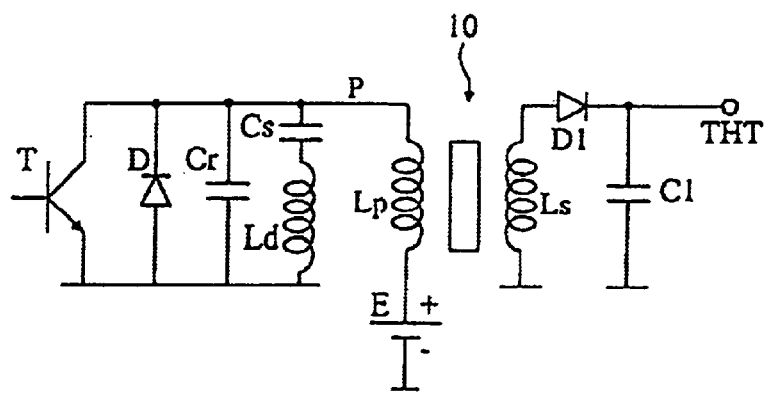
FIG. 1, previously described, shows a conventional line scan circuit.
Figure 2:
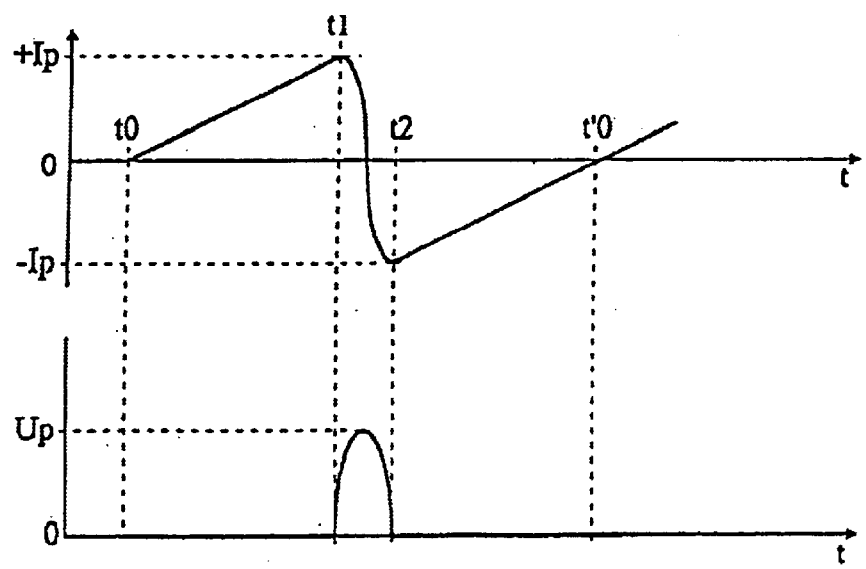
FIG. 2 shows signals illustrating the operation of the circuit of FIG. 1.
Figure 3:
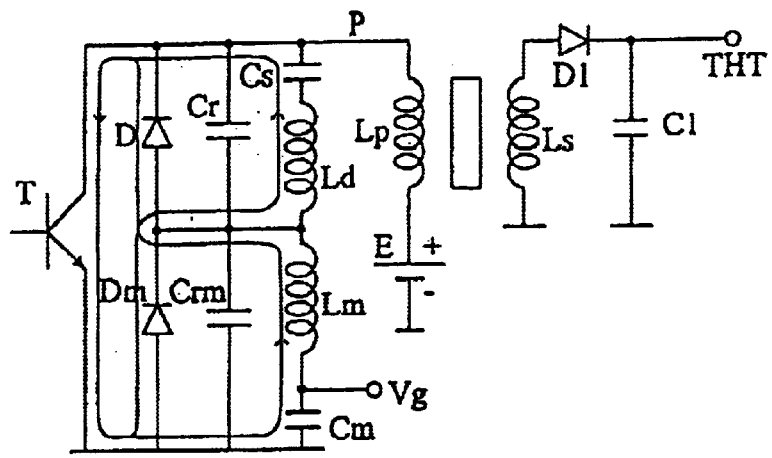
FIG. 3 shows a conventional line scan circuit called a "diode modulator"
Figure 4:
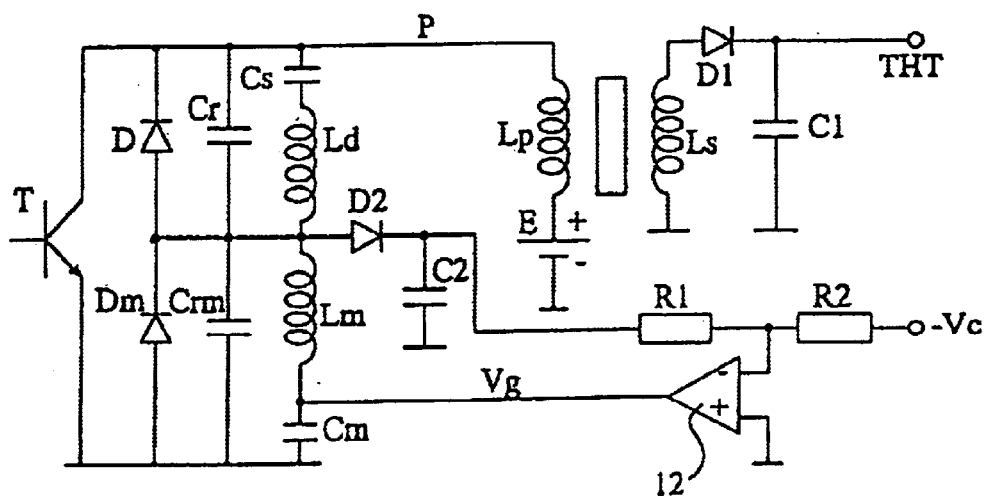
FIG. 4 shows an embodiment of a scan circuit according to the present invention.

FIG. 4 shows an embodiment of a line scan circuit using this principle. In this drawing, same elements as in FIG. 3 are designated with same references. A peak detector formed of a diode D2 and of a capacitor C2 samples the peak voltage present between coils Ld and Lm. The anode of diode D2 is connected to coils Ld and Lm while the cathode of this diode is grounded via capacitor C2. With this configuration, a substantially constant voltage equal to the positive peak voltage appearing between coils Ld and Lm is obtained across capacitor C2. It should be remembered that this peak value is equal to $Vg \cdot t1/\sqrt{(Lm \cdot Crm)}$.

This voltage is fed-back to the inverting input of an operational amplifier 12 via a resistor R1 This same inverting input receives a negative set-point voltage −Vc via a resistor R2. Set-point voltage −Vc is the one that should be independent of the horizontal frequency to perform the necessary scan current amplitude settings (setting of the horizontal image size and distortion correction).

The output of operational amplifier 12 provides the modulation voltage Vg forced across capacitor Cm. The non-inverting input of amplifier 12 receives a reference voltage, for example, the ground voltage.

With this configuration, operational amplifier 12 provides a voltage Vg such that the voltage on its inverting input is zero. In other words:

$$\frac{Vg \cdot t1}{R1\sqrt{(Lm \cdot Crm)}} = \frac{Vc}{R2} \text{ or else } Vg = R1\frac{\sqrt{(Lm \cdot Crm)}}{R2 \cdot t1}Vc.$$

From this last relation, it results that modulation voltage Vg is proportional, as desired, to the product of the scan frequency by set-point voltage Vc. Indeed, time t1, which appears at the denominator, is substantially equal to the scan half-period.

The inverting input of operational amplifier 12 forms a virtual ground enabling the discharge of capacitor C2 through resistor R1, which is necessary for the voltage across this capacitor C2 to follow the variations of the peak voltage appearing between coils Ld and Lm. The values of resistor R1 and of capacitor C2 are chosen for the discharge speed to be moderate and for the voltage across capacitor C2 to be considered as D.C. Other known types of peak detectors may of course be used.

Figure 5:
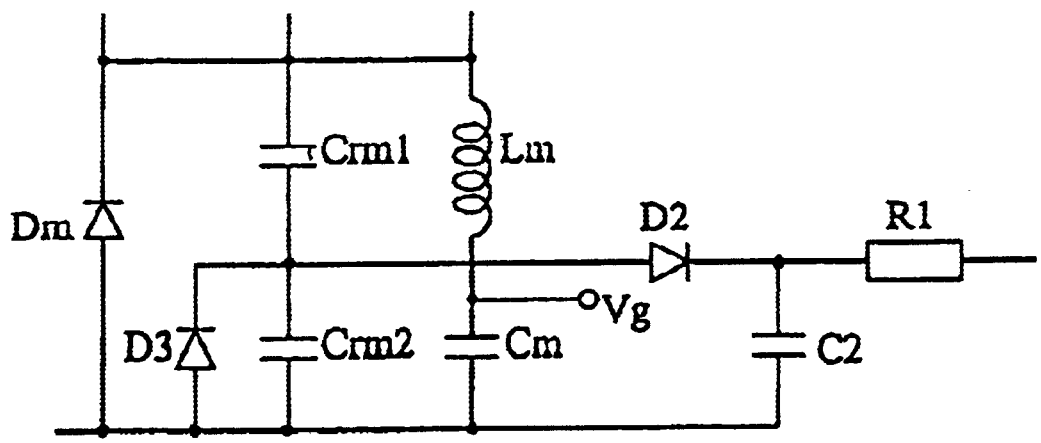
FIG. 5 shows an alternative connection of the peak detector of FIG. 4.

FIG. 5 shows an alternative connection of peak detector D2/C2 enabling the measured peak value to be reduced if necessary. Capacitor Crm is replaced by two series-connected capacitors Crm1 and Crm2, detection diode D2 being connected between these two capacitors. A capacitive divider of the peak voltage is thus obtained. A diode D3 is connected in antiparallel to capacitor Crm2 to restore, during a scan, the charge transmitted to capacitor C2 during a retrace.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A line scan circuit for a CRT, comprising:
   in series across a switch, a first and second oscillating circuits having the same time constant, each comprising, in parallel, a capacitor, a diode connected in antiparallel, and a series connection of an inductor and a voltage source, the inductor of the first oscillating circuit being a scan coil of the CRT; and adjusting means for adjusting the voltage source of the second oscillating circuit;

wherein the adjusting means includes an amplifier receiving a setpoint voltage and receiving a feedback voltage comprising a peak voltage taken from the second oscillating circuit; and wherein the amplifier comprises an operational amplifier, an inverting input of which receives a negative setpoint voltage via a first resistor and the feedback voltage via a second resistor.

2. A line scan circuit for a CRT, comprising:

a first oscillating circuit comprising a CRT scan coil;

a second oscillating circuit;

wherein the first and the second oscillating circuits are connected in series across a switch; and a peak detector circuit connected between the second oscillating circuit and ground, which provides a feedback voltage to an amplifier circuit;

wherein the amplifier circuit receives a setpoint voltage and the feedback voltage and provides a modulation voltage to the second oscillating circuit.

3. The line scan circuit of claim 2, wherein the oscillating circuits have substantially equal oscillation frequencies.

4. The line scan circuit of claim 2, wherein the feedback voltage is a voltage taken from a point joining the first and the second oscillating circuits.

5. The line scan circuit of claim 2, wherein the feedback voltage is a voltage taken between two series-connected capacitors in the second oscillating circuit.

6. The line scan circuit of claim 2, wherein the amplifier comprises an operational amplifier, one input of which receives the setpoint voltage and another input of which receives a reference voltage.

7. The line scan circuit of claim 2, further comprising a pair of diodes connected in series across the switch.

8. The line scan circuit of claim 2, wherein the first oscillating circuit is connected to a voltage source formed of a capacitor maintained charged by a supply voltage connected in series with a primary winding of a step-up transformer across the switch.

9. The line scan circuit of claim 2, wherein the modulation voltage is proportional to the oscillation frequency.

10. The line scan circuit of claim 2, wherein the modulation voltage is proportional to the setpoint voltage.

11. A line scan circuit for a CRT, comprising:

a first and a second oscillating circuits connected in series across a switch, each oscillating circuit including, in parallel, a capacitor, a diode connected in antiparallel, and a series connection of an inductor and a voltage source, the inductor of the first oscillating circuit being a scan coil of the CRT; and an amplifier receiving a setpoint voltage and receiving a feedback voltage, the feedback voltage comprising a peak voltage taken from the second oscillating circuit; and wherein the amplifier generates an output, in response to the setpoint voltage and the feedback voltage, that modulates the voltage source of the second oscillating circuit.

12. The line scan circuit of claim 10, wherein the oscillating circuits have substantially equal oscillation frequencies.

13. The line scan circuit of claim 10, wherein the feedback voltage is a voltage taken from a point joining the first and the second oscillating circuits.

14. The line scan circuit of claim 10, wherein the feedback voltage is a voltage taken from a point between two series-connected capacitors in the second oscillating circuit.

15. The line scan circuit of claim 11, further comprising a peak detector connected between the second oscillating circuit and ground, having a diode connected in series with a capacitor.

16. The line scan circuit of claim 11, wherein the voltage source of the first oscillating circuit is formed of a capacitor maintained charged by a supply voltage source connected in series with a primary winding of a step-up transformer across the switch.

17. A line scan circuit for a CRT, comprising:

a first and a second oscillating circuits connected in series across a switch, each oscillating circuit including, in parallel, a capacitor, a diode connected in antiparallel, and a series connection of an inductor and a voltage source, the inductor of the first oscillating circuit being a scan coil of the CRT; and an amplifier receiving a setpoint voltage and receiving a feedback voltage, the feedback voltage comprising a peak voltage taken from the second oscillating circuit;

wherein the amplifier modulates the voltage source of the second oscillating circuit; and wherein the amplifier comprises an operational amplifier, an input of which receives a setpoint voltage via a first resistor and the feedback voltage via a second resistor.

18. A method for controlling a line scan circuit for a CRT, comprising:

detecting a peak voltage in an oscillating circuit using a peak detector;

feeding back the peak voltage to an input of an amplifier, wherein the amplifier has an output comprising a modulation voltage provided to the oscillating circuit using the amplifier such that the modulation voltage corresponds to an oscillation frequency of the oscillating circuit; and delivering an output from the oscillating circuit to a CRT scan coil.

19. The method of claim 18, wherein detecting the peak voltage comprises taking a voltage from a point joining a first and a second oscillating circuits.

20. The method of claim 18, wherein detecting the peak voltage comprises taking a voltage from a point between two series-connected capacitors in the oscillating circuit.

21. The method of claim 18, further comprising providing a setpoint voltage to the amplifier.

22. The method of claim 21, wherein providing a setpoint voltage to the amplifier comprises providing a setpoint voltage to a non-inverting input of the amplifier.

23. The method of claim 18, further comprising transforming a supply voltage to a voltage suitable for use as a source voltage of the oscillating circuit.

24. The method of claim 23, further comprising rectifying the supply voltage.

25. The method of claim 18, wherein feeding back the peak voltage to the amplifier comprises feeding back the peak voltage to an inverting input of the amplifier.

* * * * *

UNITED STATES PATENT AND TRADEMARK OFFICE
CERTIFICATE OF CORRECTION

PATENT NO. : 6,690,125 B1
DATED : February 10, 2004
INVENTOR(S) : Jean-Michel Moreau It is certified that error appears in the above-identified patent and that said Letters Patent is hereby corrected as shown below:

<u>Title page,</u>
Item [73], should read:
-- [73] Assignee: STMicroelectronics S.A., Gentilly, (FR) --

Signed and Sealed this

Thirteenth Day of April, 2004

JON W. DUDAS
*Acting Director of the United States Patent and Trademark Office*